(12) United States Patent
Otsuki et al.

(10) Patent No.: US 9,179,025 B2
(45) Date of Patent: Nov. 3, 2015

(54) IMAGE READING DEVICE AND AUTO DOCUMENT FEEDER

(71) Applicant: MURATA MACHINERY, LTD., Kyoto-shi, Kyoto (JP)

(72) Inventors: Osamu Otsuki, Kyoto (JP); Yoshitaka Nose, Kyoto (JP); Satoshi Washida, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 14/565,762

(22) Filed: Dec. 10, 2014

(65) Prior Publication Data

US 2015/0189111 A1 Jul. 2, 2015

(30) Foreign Application Priority Data

Dec. 26, 2013 (JP) .................................. 2013-270290

(51) Int. Cl.
*H04N 1/04* (2006.01)
*H04N 1/00* (2006.01)
*B65H 7/20* (2006.01)
*B65H 29/58* (2006.01)
*B65H 43/00* (2006.01)
*B65H 29/64* (2006.01)

(52) U.S. Cl.
CPC ............. *H04N 1/00575* (2013.01); *B65H 7/20* (2013.01); *B65H 29/58* (2013.01); *B65H 29/64* (2013.01); *B65H 43/00* (2013.01); *H04N 1/00602* (2013.01); *H04N 1/00612* (2013.01); *H04N 1/00806* (2013.01)

(58) Field of Classification Search
None
See application file for complete search history.

(56) References Cited

U.S. PATENT DOCUMENTS

| 5,812,912 | A | | 9/1998 | Hiroi et al. |
| 5,926,681 | A | * | 7/1999 | Ishimaru ....................... 399/367 |
| 6,081,687 | A | | 6/2000 | Munemori et al. |
| 6,151,478 | A | * | 11/2000 | Katsuta .................... B65H 5/34 271/258.01 |
| 6,321,064 | B1 | * | 11/2001 | Mizubata ............... G03G 15/60 399/367 |
| 6,393,251 | B2 | * | 5/2002 | Kono ............................ 399/370 |
| 6,585,258 | B1 | * | 7/2003 | Hirota .................... G03G 15/60 271/10.01 |
| 6,648,320 | B2 | * | 11/2003 | Iino et al. ...................... 271/3.15 |
| 6,674,991 | B2 | * | 1/2004 | Makino et al. ................ 399/374 |
| 6,796,559 | B2 | * | 9/2004 | Hirota et al. .................. 271/225 |

(Continued)

FOREIGN PATENT DOCUMENTS

| JP | 09-114143 A | 5/1997 |
| JP | 2013-074545 A | 4/2013 |

*Primary Examiner* — Dung Tran
(74) *Attorney, Agent, or Firm* — Keating & Bennett, LLP

(57) ABSTRACT

An image reading device includes a reading portion, a document type specifying device, and a feed controller. At the reading portion, one side of a document is read. The document type specifying device is configured to specify whether the document is a first type document or a second type document of which length in a feed direction is longer than the first type document. The feed controller is configured or programmed to perform a U-turn control and a switchback control. In the U-turn control, after reading a first side of the first type document at the reading portion, the first type document is fed in a U-turn manner without switching back, and a second side of the first type document is read at the reading portion. In the switchback control, after reading a first side of the second type document at the reading portion, the second type document is caused to switch back, and then a second side of the second type document is read at the reading portion.

10 Claims, 10 Drawing Sheets

(56) References Cited

U.S. PATENT DOCUMENTS

| | | | |
|---|---|---|---|
| 7,869,755 B2* | 1/2011 | Sano et al. | 399/367 |
| 7,924,475 B2* | 4/2011 | Suzuki | 358/474 |
| 8,314,976 B2* | 11/2012 | Maeshima | H04N 1/00572 358/474 |
| 8,582,184 B2* | 11/2013 | Oshima | 358/474 |
| 8,824,027 B2* | 9/2014 | Tonooka et al. | 358/498 |
| 2003/0006544 A1* | 1/2003 | Iino | G03G 15/60 271/3.14 |
| 2004/0057079 A1* | 3/2004 | Ohsawa | 358/2.1 |
| 2007/0109614 A1* | 5/2007 | Iwago et al. | 358/498 |
| 2008/0278523 A1 | 11/2008 | Uchida | |
| 2009/0096151 A1* | 4/2009 | Tokutsu | 271/3.14 |

* cited by examiner

FEED PATH IN CASE OF READING ONE SIDE

FEED PATH IN CASE OF U-TURN

FIRST FEED PATH AFTER SWITCHBACK

SECOND FEED PATH AFTER SWITCHBACK

IMAGE READING DEVICE AND AUTO DOCUMENT FEEDER

CROSS-REFERENCE TO RELATED APPLICATIONS

This application claims priority under 35 U.S.C. 119 to Japanese Patent Application No. 2013-270290, filed on Dec. 26, 2013, which application is hereby incorporated by reference in its entirety.

BACKGROUND OF THE INVENTION

1. Field of the Invention

The present invention relates to a configuration and a control of an Auto Document Feeder (ADF).

2. Description of the Related Art

In a field of an image reading device such as a copy machine, a facsimile, and the like, there is known an Auto Document Feeder (ADF) configured to automatically feed a document.

In a case where a document feeder is provided with only one reading device, a document needs to be turned over such that both sides thereof are read. An ADF thus may be configured to be capable of turning over the document in some cases.

As a method for turning over the document by the ADF, a method for turning over the document by feeding the document in a switchback manner (a switchback method) is commonly employed.

Furthermore, as a method for turning over the document, there is also known a configuration in which the document is fed in a U-turn manner (a U-turn method).

In a case of employing the U-turn method, there is a problem in which since the number of rollers to feed the document in the U-turn manner is increased and thereby the number of components is increased to handle a document having a long length in a feed direction, the ADF increases in size, which leads to increases in cost.

In this respect, since there is not a problem as described above in a case of the switchback method, there is an advantage in which the ADF can be reduced in size. In the switchback method, however, since the feed direction of the document is reversed, feeding the document takes time. Thus, in the case of employing the switchback method, reading the document at a high speed is difficult.

There is publicly known a reading device configured to switch paths for a U-turn according to a length of the document. Since the reading device feeds a short document in a U-turn path for a short document and feeds a long document in a U-turn path for a long document, both the short document and the long document can be handled. However, the reading device still forms a path for the long document to perform a U-turn within a device of the ADF. The reading device thus cannot resolve the problem in which the device increases in size to be capable of reading both sides of the long document.

As an art not related to the reading device, there is publicly known a recording device configured to switch a U-turn feeding and a switchback feeding according to a type or a size of a paper. However, an object of the above-described recording device is not to damage a coating surface of a special recording paper, and thus the recording device is regarded as an art not related to the ADF that feeds a document.

In the above-described recording device, the switching between the U-turn feeding and the switchback feeding is performed when feeding a recording medium to record on a first side thereof. When turning over the recording medium to record on a second side thereof after recording on the first side, the recording device performs the U-turn feeding irrespective of the type or the size of the paper. Therefore, even if applying a configuration of the above-described recording device to the ADF, similarly to the above-described reading device, the recording device cannot resolve the problem in which the device increases in size to be capable of reading both sides of the long document.

SUMMARY OF THE INVENTION

Preferred embodiments of the present invention provide an ADF having a compact configuration in which both sides of a long document are read and a reduction in a reading speed is prevented.

According to a first aspect of various preferred embodiments of the present invention, an image reading device according to a preferred embodiment of the present invention includes a reading portion, a document type specifying device, and a feed controller. At the reading portion, one side of a document is read. The document type specifying device is configured to specify whether the document is a first type document or a second type document of which length in a feed direction is longer than the first type document. The feed controller is configured to perform a U-turn control and a switchback control. In the U-turn control, after a first side of the first type document has been read at the reading portion, the first type document is fed in a U-turn manner without switching back, and a second side of the first type document is read at the reading portion. In the switchback control, after a first side of the second type document has been read at the reading portion, the second type document is caused to switch back, and a second side of the second type document is read at the reading portion.

When reading both sides of a short document (the first type document), the document is turned over in the U-turn manner to read the second side without switching back, and thus the reading of the document is performed at a higher speed compared to the switchback method. When reading both sides of a long document (the second type document), the document is turned over in a switchback manner, and thus a path for the U-turn is not required to be long, allowing a compact configuration of the device.

The image reading device is preferably configured such that in the switchback control, the feed controller causes the second type document to switch back and then to enter the reading portion in a first direction after causing the second type document to enter the reading portion in the first direction and reading the first side.

By causing the second type document of which the first side has been read at the reading portion to switch back and then to enter with respect to the reading portion in a same direction again, the second type document is turned over and the second side is read.

The image reading device is preferably configured such that in the switchback control, the feed controller causes the second type document to switch back and to pass the reading portion in a second direction, which is opposite to the first direction, after causing the second type document to enter the reading portion in the first direction and reading the first side, and then causes the second type document to switch back again such that the second type document enters the reading portion in the second direction.

In such a manner, the second type document of which the first side has been read at the reading portion may be caused to enter in an opposite direction with respect to the reading portion after switching back. In this case, however, since the document is not turned over by performing the switchback one time, as described above, the switchback is required to be performed two times to read the second side.

The image reading device preferably includes a first feed path in which the document of which a first side has been read is fed in a predetermined direction. The feed controller causes the second type document of which the first side has been read to switch back and then feeds the second type document in the first feed path in a direction opposite to the predetermined direction so as to enter the reading portion.

By use of the first feed path in which the document of which the first side has been read is fed, the second type document after switching back is fed to the reading portion.

The image reading device preferably includes a first feed path in which the document of which a first side has been read is fed in a predetermined direction. The feed controller causes the second type document of which the first side has been read to switch back and then feeds the second type document in a path different from the first feed path so as to enter the reading portion in the second direction.

Since the first feed path in which the document after the first side is read is fed and the path in which the second type document after switching back is fed to the reading portion are different, a feed roller and the like in the first feed path are not required to be reversed.

The image reading device preferably includes a U-turn path and a third feed path. In the U-turn path, the first type document that has been fed in the first feed path is fed to the reading portion in the U-turn manner. In the third feed path, the second type document that has switched back is introduced to the U-turn path.

Accordingly, the second type document after switching back is fed to the reading portion by use of the U-turn path.

The image reading device is preferably configured such that the document type specifying device specifies whether a type of the document is the first type document or the second type document according to the length of the document in the feed direction. The feed controller is configured or programmed to switch and perform the switchback control and the U-turn control according to the type of the document specified by the document type specifying device.

The image reading device preferably includes a document length sensor configured to detect a document length, which is the length of the document in the feed direction. The document type specifying device is configured to specify whether the type of the document is the first type document or the second type document based on whether or not the document length detected by the document length sensor is equal to or more than a predetermined length.

The image reading device preferably includes a first feed path and a U-turn path. In the first feed path, the document of which a first side has been read at the reading portion is fed in a predetermined direction. In the U-turn path, the first type document that has been fed in the first feed path is fed to the reading portion in the U-turn manner. The first feed path and the U-turn path defines a loop path with the reading portion as a starting point. The predetermined length is a path length of the loop path in the feed direction of the document.

The image reading device preferably includes an operation inputting device configured to detect a document length, which is the length of the document in the feed direction, by accepting an input by an operator. The document type specifying device is configured to specify whether the type of the document is the first type document or the second type document based on the document length detected by the operation inputting device.

The image reading device preferably includes a paper feed tray, a discharge tray, an introduction path, a resist device, and a second feed path. The document is set on the paper feed tray. The document that has been read at the reading portion is discharged to the discharge tray. In the introduction path, the document is fed from a side of the paper feed tray to the reading portion. The resist device is arranged in a middle of the introduction path. In the second feed path, the document is fed from the reading portion toward a side of the discharge tray via the resist device. In the U-turn control, the feed controller is configured or programmed to cause a second side of the document to be read at the reading portion after turning over by the first feed path and the U-turn path, the document of which a first side has been read. Subsequently, in the U-turn control, the feed controller is configured or programmed to discharge the document toward the discharge tray after turning over the document of which the second side has been read.

A configuration may be made as a copy machine including the image reading device, an image forming device, and a paper feed cassette. The image forming device is configured to form images on a paper based on read data, which are images of a document read by the image reading device. The paper feed cassette is configured to accommodate a paper therein and to feed the paper to the image forming device.

According to a second aspect of various preferred embodiments of the present invention, an image reading device includes a document length acquiring device and a controller. The document length acquiring device is configured to acquire a length of a document in a feed direction. The controller is configured or programmed to switch and perform a U-turn control and a switchback control according to the length of the document in the feed direction. In the U-turn control, the document is caused to U-turn without switching back such that both sides of the document are read. In the switchback control, the document is caused to switch back such that both sides of the document are read.

With the image reading device, a U-turn method and a switchback method preferably are used according to the length of the document in the feed direction. Accordingly, the image reading device is able to be configured to be compact, and reduction in a reading speed is reliably prevented.

According to a third aspect of various preferred embodiments of the present invention, an auto document feeder includes a reading portion, a document type specifying device, and a feed controller. At the reading portion, one side of a document is read. The document type specifying device is configured to specify whether the document is a first type document or a second type document of which length in a feed direction is longer than the first type document. The feed controller is configured or programmed to perform a U-turn control and a switchback control. In the U-turn control, after the first type document specified by the document type specifying device has been fed to the reading portion in an orientation in which a first side of the first type document is read, the first type document is fed in a U-turn manner without switching back and is further fed to the reading portion in an orientation in which a second side of the first type document is read. In the switchback control, after the second type document specified by the document type specifying device has been fed to the reading portion in an orientation in which a first side of the second type document is read, the second type document is caused to switch back and is fed to the reading portion in an orientation in which a second side of the second type document is read.

When feeding a short document (the first type document), the document is turned over by the U-turn method, and thus reading of the document is performed at a higher speed compared to the switchback method. When transporting a long document (the second type document), the document is turned over by the switchback method, and thus a path for a U-turn is not required to be long, allowing a compact configuration of the device.

According to a fourth aspect of various preferred embodiments of the present invention, an auto document feeder includes a reading portion, a document length acquiring device, and a feed controller. At the reading portion, one side of a document is read. The document length acquiring device is configured to acquire a length of the document in a feed direction. The feed controller is configured or programmed to switch and perform a U-turn control and a switchback control according to the length of the document in the feed direction acquired by the document length acquiring device. In the U-turn control, the document fed to the reading portion is turned over by U-turning without switching back and then is fed to the reading portion. In the switchback control, the document fed to the reading portion is turned over by switching back and is then fed to the reading portion.

With the auto document feeder, a U-turn method and a switchback method preferably are used according to the length of the document in the feed direction. Accordingly, the image reading device preferably is configured to be compact, and a reduction in a reading speed is reliably prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
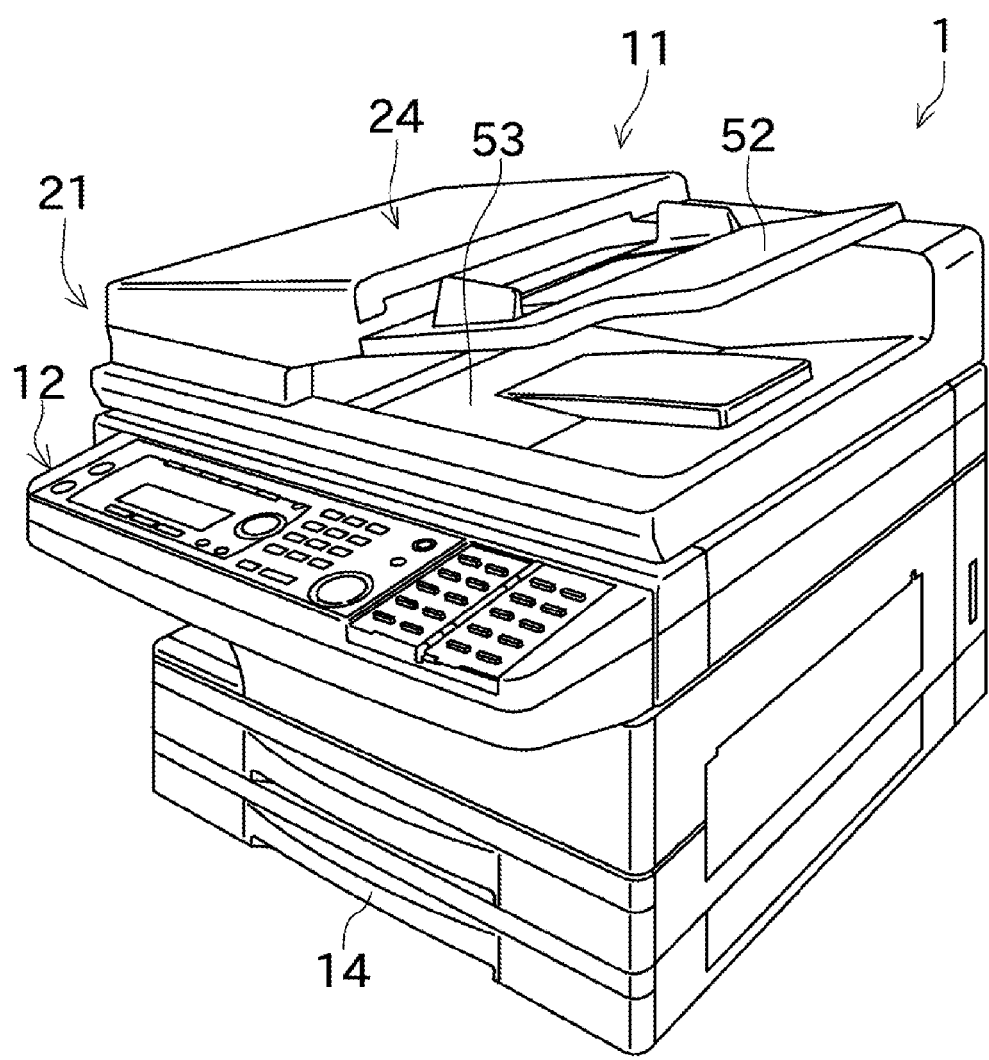
FIG. 1 is a perspective view illustrating an overall structure of a multifunction peripheral according to a preferred embodiment of the present invention.

Next, preferred embodiments of the present invention will be described with reference to the drawings. FIG. 1 is an external perspective view of a multifunction peripheral device 1 according to a first preferred embodiment of the present invention.

The multifunction peripheral device 1 is configured to perform functions as a copy machine and a facsimile transmitting/receiving machine. The multifunction peripheral device 1 includes an image reading device 11 configured to read images of a document when copying or facsimile transmitting. The multifunction peripheral device 1 of the present preferred embodiment thus can be defined as an "image reading device". The multifunction peripheral device 1 further includes an operation panel 12 configured to instruct a number of copies, a facsimile destination, reading of a document, and the like. On an upper portion of a main body of the multifunction peripheral device 1, a platen cover 21 configured to be openable/closable with respect to the main body is provided.

The main body of the multifunction peripheral device 1 further includes a built-in image forming device configured to form images on a paper (a recording medium) based on read data, which are images of a document read by the image reading device 11, for example, and a paper feed cassette 14 configured to sequentially feed the paper. The main body of the multifunction peripheral device 1 includes a transmitting/receiving device (not illustrated) configured to transmit image information via a communication line.

Figure 2:
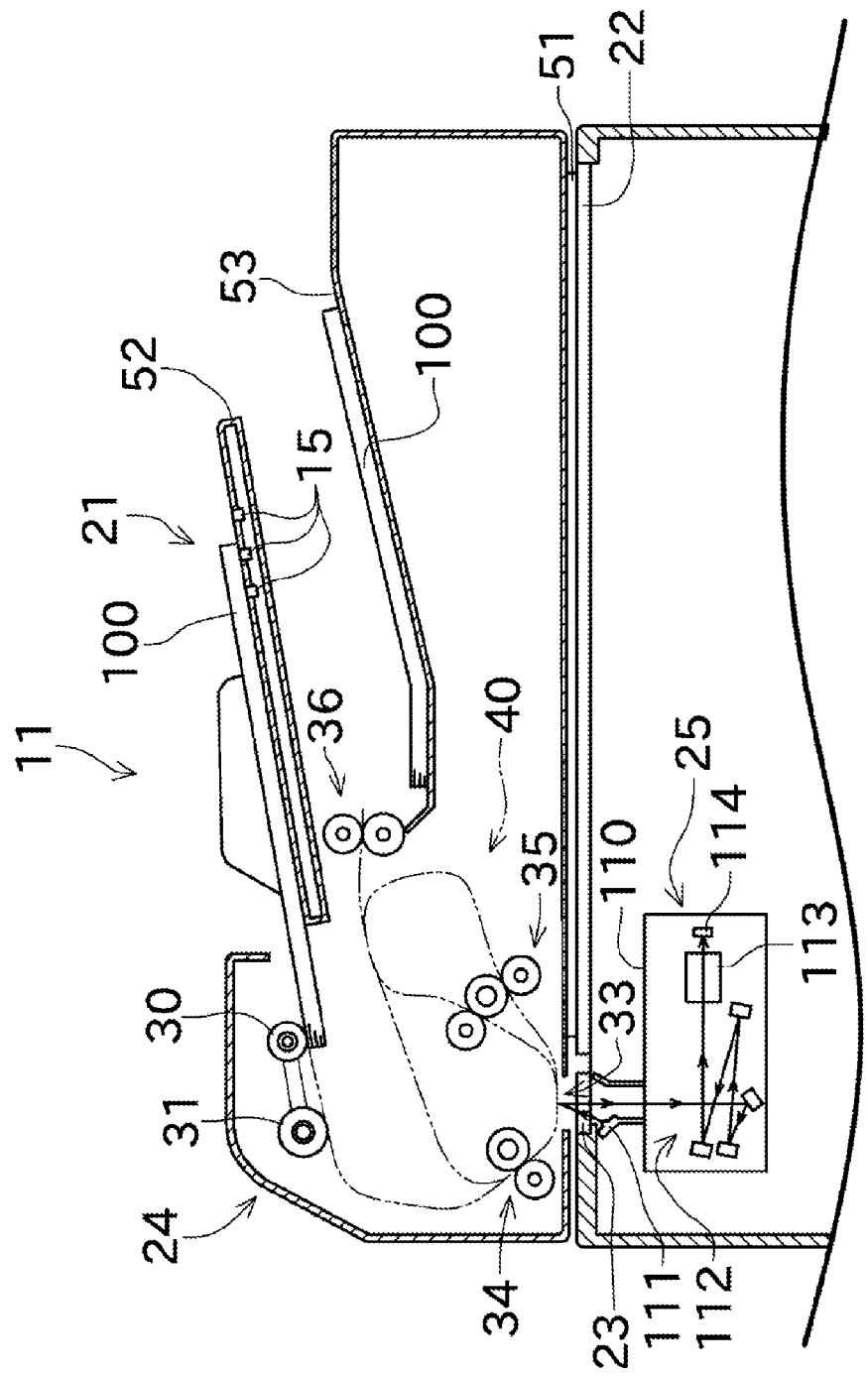
FIG. 2 is a schematic sectional front view of an image reading device.

Next, the image reading device 11 provided to the multifunction peripheral device 1 will be described with reference to FIG. 2. FIG. 2 is a sectional front view illustrating a structure of the image reading device 11.

As illustrated in FIG. 2, the image reading device 11 includes the platen cover 21, a platen glass 22, and a contact glass 23. The platen cover 21 includes an Auto Document Feeder (ADF) 24. The image reading device 11 includes below the platen glass 22 and the contact glass 23, a scanner (a reading device) 25 configured to read image information of a document 100.

The scanner 25 is configured as a reading device of a reduction optical system, and includes a carriage 110 capable of moving along a lower surface of the platen glass 22. A light source 111, a plurality of reflecting mirrors 112, a condenser lens 113, a Charge-Coupled Device (CCD) 114 are arranged in the carriage 110. The light source 111 is configured to reflect light with respect to the document 100. Reflected light from the document 100 is reflected by the plurality of reflecting mirrors 112, and then passes through the condenser lens 113 and converges to form an image on a surface of the CCD 114. Subsequently, the CCD 114 converts the incident convergent light into an electric signal to output. The scanner 25 is not limited to the above-described reading device of the reduction optical system using the CCD, and may be a reading device of an equal magnification optical system using a Contact Image Sensor (CIS).

As illustrated in FIG. 2, the ADF 24 provided to the platen cover 21 includes a paper feed tray 52 arranged on an upper portion of the platen cover 21, and a paper discharge tray 53 arranged below the paper feed tray 52. A document feed path 40 configured to connect the paper feed tray 52 and the paper discharge tray 53 is provided inside the ADF 24.

A document length sensor (a document length acquiring device) 15 is provided to the paper feed tray 52. The document length sensor 15 is configured to be capable of detecting a length in a feed direction of the document 100 set on the paper feed tray 52.

The image reading device 11 of the present preferred embodiment preferably is configured to function as an auto document feed scanner. In other words, when a user instructs to use the image reading device 11 as the auto document feed scanner by operating the operation panel 12 illustrated in FIG. 1, the documents 100 set to be piled up on the paper feed tray 52 are fed one by one along the document feed path 40. When the document 100 fed along the document feed path 40 passes above a glass surface of the contact glass 23, images of a side, which faces down, of the document 100 are read by the scanner 25. In the ADF 24, a position where the images of the document 100 being fed are read is referred to as a reading portion 33. The document 100 of which images have been read is then fed along the document feed path 40 and discharged to the paper discharge tray 53.

Furthermore, the image reading device 11 of the present preferred embodiment preferably is configured to function as a book scanner. That is, when using the image reading device 11 as the book scanner, the user places a book document to be read on the platen glass 22. Then, by pressing the book document from an upper side with a platen sheet 51 below the platen cover 21, the user fixes the book document not to move. Since the scanner 25 performs reading while moving along the lower surface of the platen glass 22 in this state, image information of a side, which faces down, of the book document can be read.

Next, the document feed path 40 inside the ADF 24 will be described.

Figure 3:
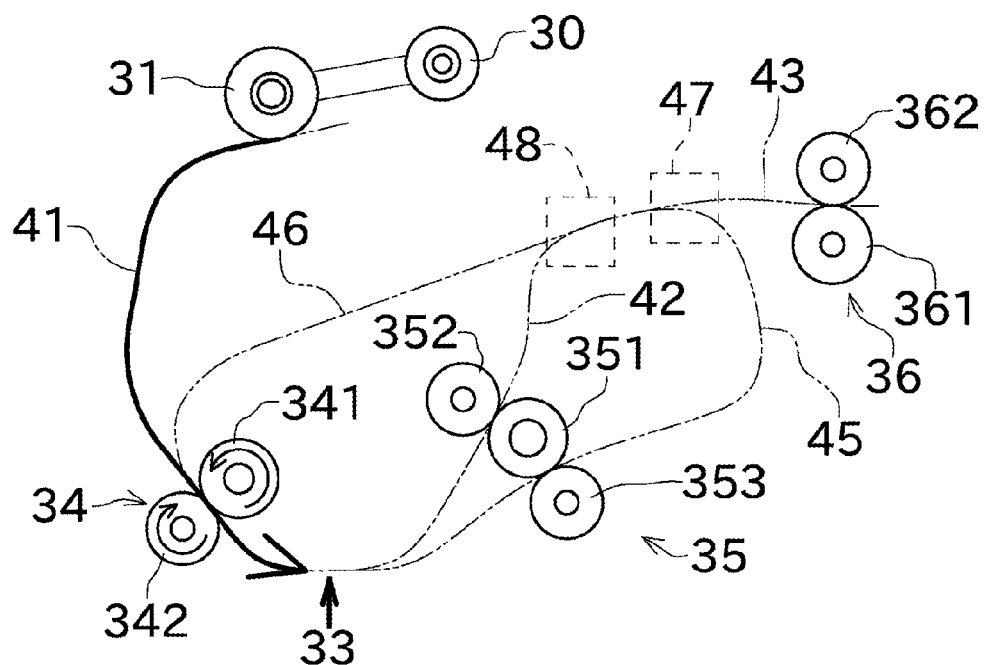
FIG. 3 is a schematic view illustrating an introduction path.

As illustrated in FIG. 3, the ADF 24 includes a pickup roller 30, a separating roller 31, a resist device 34, a triple roller 35, a discharge device 36, a first switching device 47, and the second switching device 48 in a middle of the document feed path 40. The ADF 24 includes a roller and a switching device other than illustrated components, but illustration of the roller and the switching device that are unnecessary for description is appropriately omitted.

The pickup roller 30 is configured to make contact with an end portion of a document 100 at an uppermost layer of the documents 100 set to be piled on the paper feed tray 52, and to rotate. Accordingly, the document 100 at the upper most layer is fed to the separating roller 31.

A separating member (a separating pad or a retard roller), which is not illustrated, is arranged on an opposite side of the separating roller 31 with the document feed path 40 therebetween. The document 100 fed to the separating roller 31 by drive of the pickup roller 30 is sandwiched by the separating roller 31 and the separating member. Since the separating roller 31 is driven and rotated in this state, the documents 100 are separated one by one by the separating roller 31 and the separating member, and are fed toward the document feed path 40.

In the document feed path 40, a portion where the document 100 is fed from the separating roller 31 (a side of the paper feed tray 52) to the reading portion 33 is referred to as an introduction path 41. The introduction path 41 is indicated by a thick arrow in FIG. 3. As illustrated in FIG. 3, the introduction path 41 is configured to connect the separating roller 31 to the reading position 33 in a U-turn shape.

In a middle of the introduction path 41, a resist device 34 is arranged. The resist device 34 includes a resist roller 341 configured to be rotationally driven, and a driven roller 342 arranged on an opposite side from the resist roller 341 with the introduction path 41 therebetween.

The document 100 introduced to the introduction path 41 is fed by the resist roller 341 and the driven roller 342 both rotating. A state (indicated by an arrow in FIG. 3) in which the resist roller 341 is being rotated in a direction to feed the document 100 toward the reading portion 33 is referred to as a forward rotation of the resist roller 341. A state in which the resist roller 341 is being rotated in a direction opposite to the forward rotation is referred to as a reverse rotation of the resist roller 341. The resist device 34 of the present preferred embodiment includes a rotation switching mechanism (not illustrated) capable of switching the forward rotation and the reverse rotation of the resist roller 341.

Figure 4:
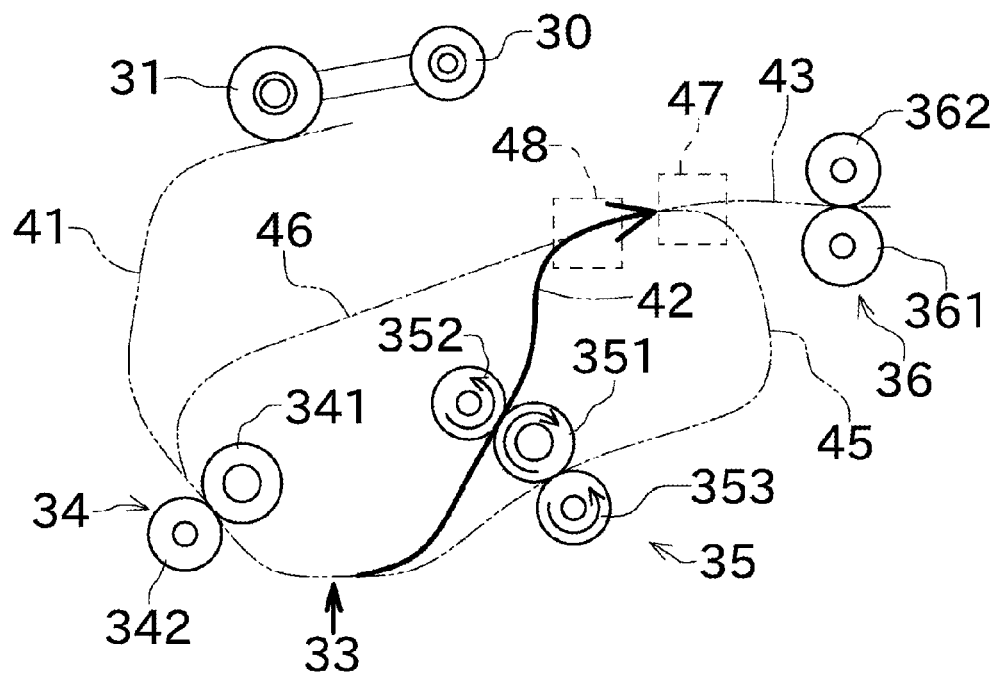
FIG. 4 is a schematic view illustrating a first feed path.

In the document feed path 40, a portion where the document 100 is fed from the reading portion 33 to the first switching device 47 is referred to as a first feed path 42. The first feed path 42 is indicated by a thick arrow in FIG. 4. As illustrated in FIG. 4, the first feed path 42 connects the reading portion 33 to the first switching device 47 without making a U-turn (without changing a direction).

Figure 5:
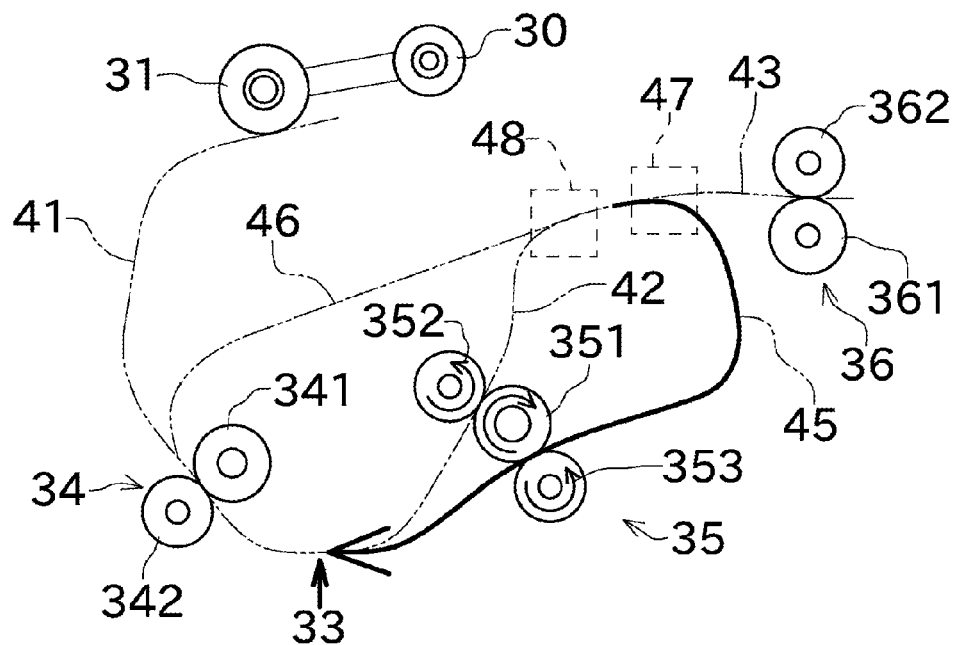
FIG. 5 is a schematic view illustrating a U-turn path.

In the document feed path 40, a portion where the document 100 is fed from the first switching device 47 to the reading portion 33 is referred to as a U-turn path 45. The U-turn path 45 is indicated by a thick arrow in FIG. 5. As illustrated in FIG. 5, the U-turn path 45 is configured so as to connect from the first switching device 47 to the reading portion 33 in a U-turn shape.

As illustrated in FIGS. 4 and 5, in a middle of the first feed path 42 and the U-turn path 45, the triple roller 35 is arranged. The triple roller 35 includes a drive roller 351 arranged in a center and driven rollers 352, 353 arranged with the drive roller 351 therebetween.

The drive roller 351 is rotationally driven by a drive source (not illustrated). As illustrated in FIGS. 4 and 5, the drive roller 351 is arranged at a position sandwiched by the first feed path 42 and the U-turn path 45. The driven roller 352 is arranged on an opposite side of the drive roller 351 with the first feed path 42 therebetween. The driven roller 353 is arranged on an opposite side of the drive roller 351 with the U-turn path 45 therebetween.

The document 100 introduced to the first feed path 42 is fed by the drive roller 351 and the driven roller 352 both rotating. A state (indicated by an arrow in FIG. 4) in which the drive roller 351 is being rotated in a direction to feed the document 100 toward the first switching device 47 is referred to as a forward rotation of the drive roller 351. A state in which the drive roller 351 is being rotated in a direction opposite to the forward rotation is referred to as a reverse rotation of the drive roller 351. The triple roller 35 of the present preferred embodiment includes a rotation switching mechanism (not illustrated) capable of switching the forward rotation and the reverse rotation of the drive roller 351.

The document 100 introduced to the U-turn path 45 is fed by the drive roller 351 and the driven roller 353 both rotating. By the drive roller 351 rotating forward, the document 100 in the U-turn path 45 is fed toward the reading portion 33 (see FIG. 5).

Figure 6:
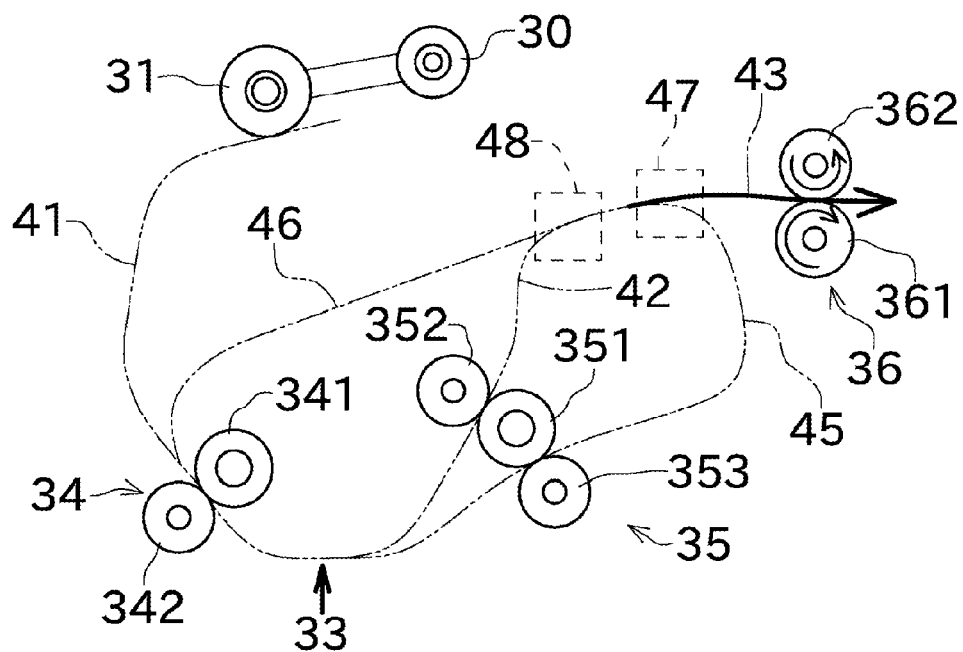
FIG. 6 is a schematic view illustrating a discharge path.

In the document feed path 40, a portion where the document 100 is fed from the first switching device 47 to the discharge device 36 is referred to as a discharge path 43. The discharge path 43 is indicated by a thick arrow in FIG. 6. As illustrated in FIG. 6, the discharge path 43 connects the first switching device 47 to the discharge device 36 without making a U-turn (without changing a direction).

The discharge device 36 includes a discharge roller 361 configured to be rotationally driven, and a driven roller 362 arranged on an opposite side of the discharge roller 361 with the discharge path 43 therebetween.

The document 100 introduced to the discharge path 43 is fed by the discharge roller 361 and the driven roller 362 both rotating, and is discharged to the discharge tray 53. A state (indicated by an arrow in FIG. 6) in which the discharge roller 361 is being rotated in a direction to discharge the document 100 to the discharge tray 53 is referred to as a forward rotation of the discharge roller 361. A state in which the discharge roller 361 is being rotated in an direction opposite to the forward rotation is referred to as a reverse rotation of the discharge roller 361. The discharge device 36 of the present preferred embodiment includes a rotation switching mechanism (not illustrated) capable of switching the forward rotation and the reverse rotation of the discharge roller 361.

Figure 7:
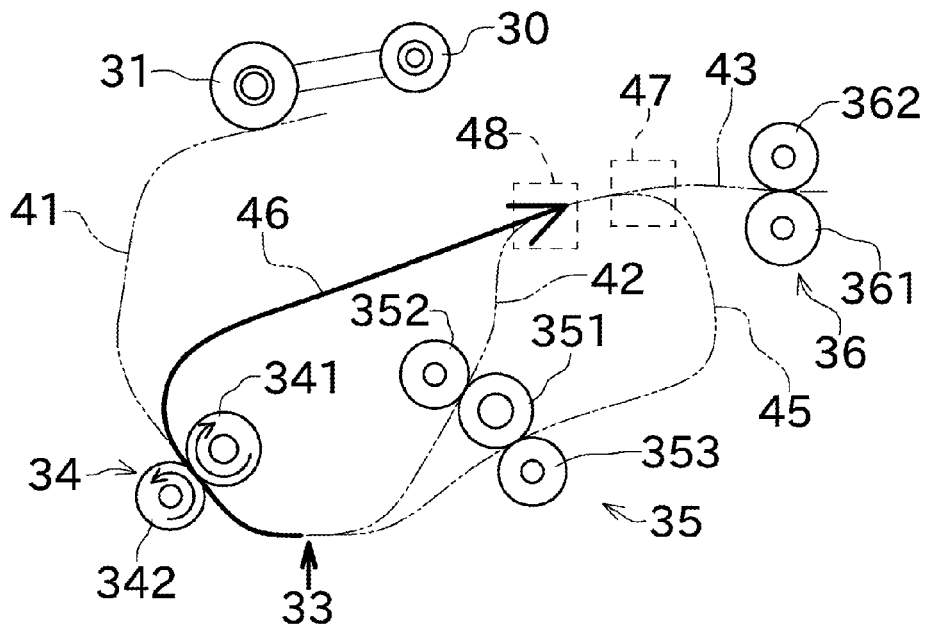
FIG. 7 is a schematic view illustrating a second feed path.

In the document feed path 40, a portion where the document 100 is fed from the reading portion 33 to the second switching device 48 via the resist device 34 is referred to as a second feed path 46. The second feed path 46 is indicated by a thick arrow in FIG. 7. As illustrated in FIG. 7, the second feed path 46 is configured so as to connect from the reading portion 33 to the second switching device 48 in a U-turn shape.

The second switching device 48 is provided farther upstream of the first switching device 47 (on a side close to the reading portion 33) in the first feed path 42. The second switching device 48 is configured to be capable of arbitrarily switching a destination of the document 100 fed from a side of the first switching device 47 to either of the first feed path 42 or the second feed path 46.

The first switching device 47 is configured to be capable of arbitrarily switching a destination of the document 100 fed from a side of the second switching device 48 to either of the U-turn path 45 or the discharge path 43.

The ADF 24 includes a controller (not illustrated) configured or programmed to control an operation of the ADF 24. The controller preferably includes hardware such as a CPU, an ROM, an RAM, and the like, and software such as a program stored in the ROM, and the like, for example. The operation of the ADF 24 is controlled by the hardware and the software in cooperation with each other.

The controller is configured or programmed to be able to realize a function as a feed controller configured to control feeding of the document 100 by the ADF 24. The controller as the feed controller is configured or programmed to control feeding of the document 100 by controlling the rotation directions of the resist roller 341, the drive roller 351 of the triple roller 35, and the discharge roller 361, and switching of a path with the first switching device 47 and the second switching device 48.

Next, operations to feed the document 100 by the ADF 24 configured as described above will be described.

Figure 8:
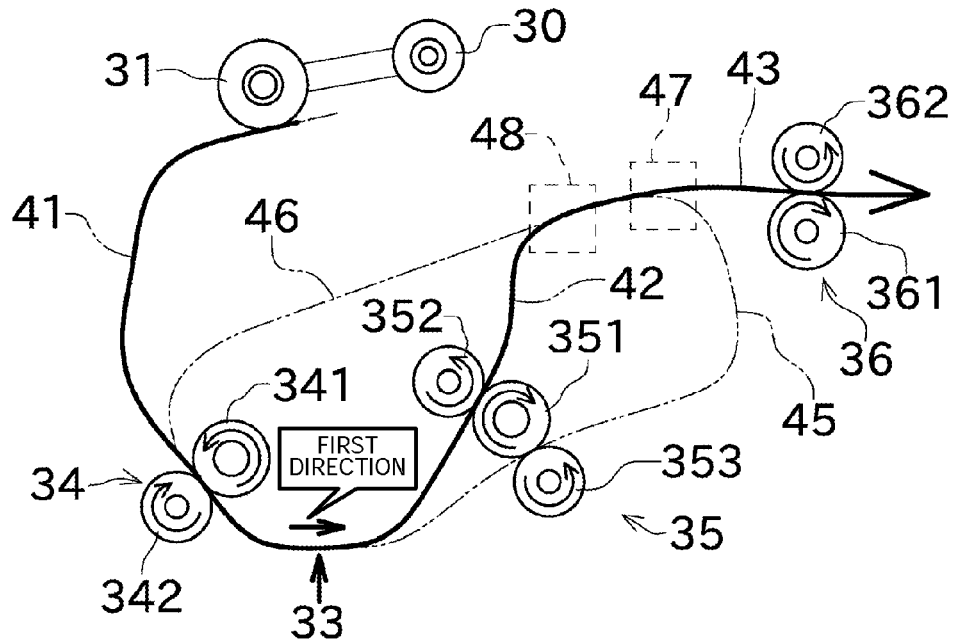
FIG. 8 is a schematic view illustrating a feed path in a case of reading one side.

First, a case of reading images of one side of the document 100 will be described. In a case of feeding the document 100 by the ADF 24 and reading only images of one side of the document 100, the document 100 is fed in a feed path as illustrated in FIG. 8.

That is, the controller of the ADF 24 drives the pickup roller 30 and the separating roller 31 to feed only one document 100 into the introduction path 41. A tip end portion of the fed document 100 moves forward in the introduction path 41 and reaches the resist device 34.

The controller is configured or programmed to temporarily stop and loosen the tip end portion of the fed document 100 by controlling the rotation of the resist roller 341, and then to feed the document 100 downstream after a predetermined period of time while removing the loosening. Accordingly, a skew of the document 100 is corrected. Subsequently, the controller feeds the document 100 toward the reading portion 33 by forward rotating the resist roller 341.

The document 100 fed in the introduction path 41 enters the reading portion 33. At the reading portion 33, a side of the document 100 that faces down is read by the scanner 25. A side initially read by the scanner 25 of both sides of the document 100 is referred to as a "first side" of the document 100. An opposite side to the first side is referred to as a "second side" of the document 100. A direction in which the document 100 enters the reading portion 33 when reading the first side of the document 100 is referred to as a "first direction" (see FIG. 8).

As described above, since the introduction path 41 is configured in the U-turn shape, the document 100 is turned over by being fed in a U-turn manner in the introduction path 41. Thus, the document 100 is required to be set on the paper supply tray 52 such that the first side to be read faces up.

As illustrated in FIG. 8, the document 100 of which the first side has been read is introduced to the first feed path 42. At this time, the controller feeds the document 100 toward the first switching device 47 by forward rotating the drive roller 351 of the triple roller 35.

The controller sets a destination of the document 100 fed to the first switching device 47 as the discharge path 43 by controlling the first switching device 47. Accordingly, the document 100 of which the first side has been read is introduced to the discharge path 43.

The document 100 introduced to the discharge path 43 is fed to the discharge device 36. At this time, the controller discharges the document 100 to the discharge tray 53 by forward rotating the discharge roller 361.

As described above, the first side of the document 100 is read, and the document 100 is discharged to the discharge tray 53.

In the case of feeding the document 100 as described above, the document 100 is discharged to the discharge tray 53 with the first side facing down. In other words, the document 100 is discharged to the discharge tray 53 in a state of a so-called face-down. The document 100 thus is discharged to the discharge tray 53 without changing an order of the documents 100 set on the paper supply tray 52.

Next, a case of reading images of both sides of the document 100 will be described.

To read both sides of the document 100, the document 100 is required to be turned over to read the second side after reading the first side. The controller of the ADF 24 of the present preferred embodiment is configured to selectively perform a U-turn control or a switchback control to turn over the document 100.

First, a feed path of a document in the U-turn control will be described. First, similarly to the above-described one-side reading, the controller introduces the document 100 to the introduction path 41 and feeds the document 100 to the reading portion 33 to cause the document 100 to enter the reading portion 33 in the first direction. Accordingly, the first side of the document 100 is read by the scanner 25.

Figure 9:
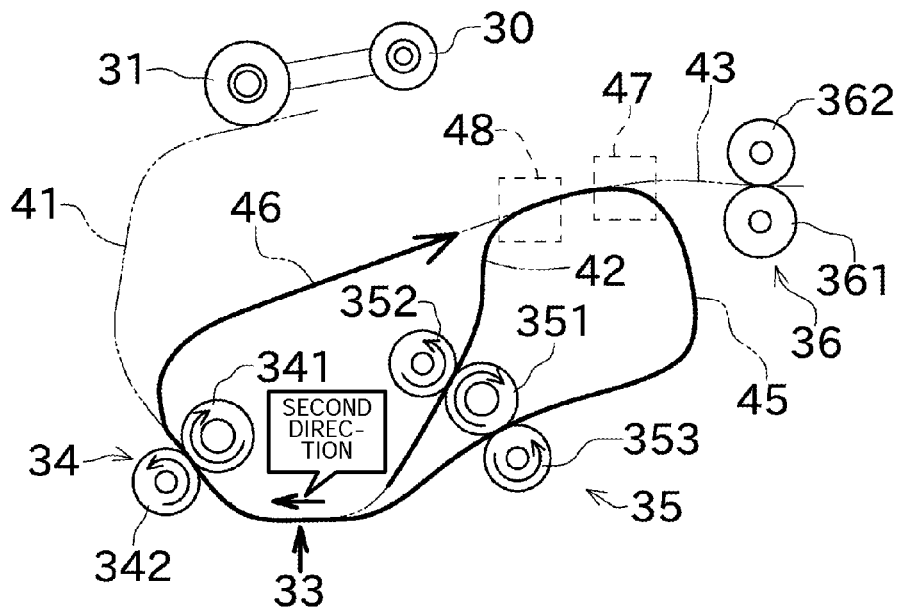
FIG. 9 is a schematic view illustrating a feed path of a document after a first type document has been read in a U-turn control.

A feed path of the document 100 after the first side has been read in the U-turn control is illustrated in FIG. 9. As illustrated in FIG. 9, the document 100 of which the first side has been read is introduced to the first feed path 42. At this time, the controller feeds the document 100 toward the first switching device 47 by forward rotating the drive roller 351 of the triple roller 35.

In the U-turn control, the controller sets a destination of the document 100 fed to the first switching device 47 as the U-turn path 45 by controlling the first switching device 47. Accordingly, the document 100 of which the first side has been read is introduced to the U-turn path 45. At this time, the controller feeds the document 100 toward the reading portion 33 by forward rotating the drive roller 351 of the triple roller 35.

In the U-turn control, the document 100 of which the first side has been read is fed in a U-turn manner without switching back and is again fed to the reading portion 33. By being fed in the U-turn manner, the document 100 is turned over, causing the second side to face down. Since the document 100 enters the reading portion 33 in this state, the second side of the document 100 is read by the scanner 25. At this time, a direction in which the document 100 enters the reading portion 33 is a direction (hereinafter referred to as a "second direction") opposite from the first direction (see FIG. 9).

In the U-turn control, the document 100 of which the second side has been read at the reading portion 33 is introduced to the second feed path 46. At this time, the controller feeds the document 100 toward the first switching device 47 by reversely rotating the resist roller 341 (see FIG. 9).

When the document 100 of which the second side has been read is fed from the U-turn path 45 to the first switching device 47, the controller sets a destination of the document 100 as the discharge path 43 by controlling the first switching device 47. Accordingly, the document 100 of which the first side has been read is introduced to the discharge path 43.

The document 100 introduced to the discharge path 43 is fed to the discharge device 36. At this time, the controller discharges the document 100 to the discharge tray 53 by forward rotating the discharge roller 361.

As described above, the second feed path 46 preferably has the U-turn shape. Accordingly, after the second side has been read, the document 100 fed in the second feed path 46 is turned over, again causing the first side to face down. The document 100 is thus discharged to the discharge tray 53 with the first side facing down. Accordingly, also in a case where both sides of the document 100 are read in the U-turn manner, the document 100 is discharged to the discharge tray 53 in the state of the face-down.

As described above, in the U-turn control, the document 100 is turned over without switching back by being fed in the U-turn path 45, such that the second side is read.

Next, a feed path of a document in the switchback control will be described. Also in this case, similarly to the U-turn control, the controller reads the first side of the document 100 and feeds the document 100 to the first switching device 47.

In the switchback control, the controller sets a destination of the document 100 fed to the first switching device 47 as the discharge path 43 by controlling the first switching device 47. Accordingly, the document 100 of which the first side has been read is introduced to the discharge path 43.

The document 100 introduced to the discharge path 43 is fed to the discharge device 36. In the switchback control of the present preferred embodiment, a switchback of the document 100 is performed by the discharge roller 361 of the discharge device 36. In other words, by forward rotating the discharge roller 361, the controller feeds the document 100 toward outside of a device of the ADF 24 (toward the discharge tray 53). Accordingly, the document 100 is brought into a state in which a portion on a tip end side of the document 100 is discharged from the discharge device 36 to the outside of the device of the ADF 24 (on the discharge tray 53). This state is illustrated in FIG. 10.

Figure 10:
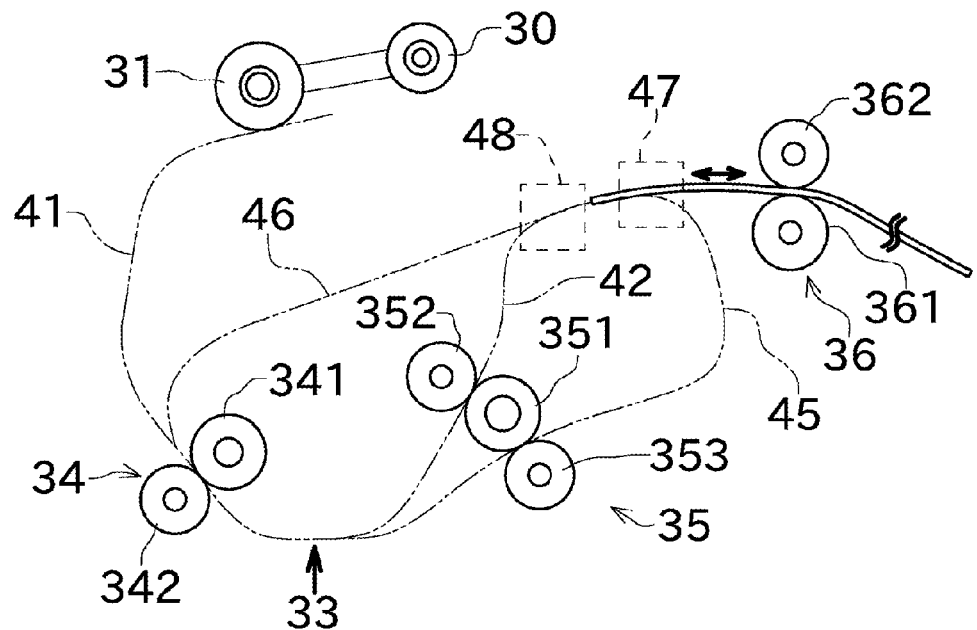
FIG. 10 is a schematic view illustrating a state in which a document is caused to switch back.

When detecting with an appropriate sensor that a rear end portion of the document 100 has passed a position of the second switching device 48, the controller stops the rotation of the discharge roller 361 (a state of FIG. 10). Subsequently, the controller reversely rotates the discharge roller 361 and feeds the document 100 discharged to the outside of the device of the ADF 24 into the device again (a switchback). By the switchback, a moving direction of the document 100 is reversed.

Figure 11:
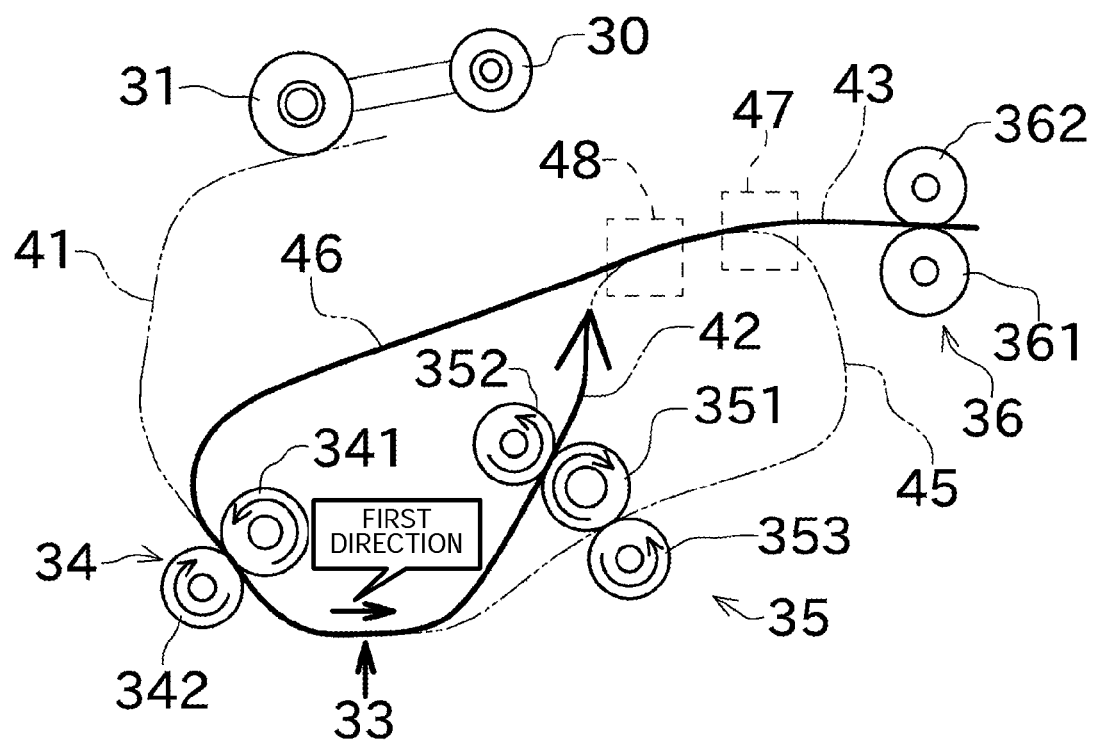
FIG. 11 is a schematic view illustrating a feed path of a document after a switchback (a feed path after a first switchback) in a switchback control.

At this time, the controller sets a destination of the document 100 caused to switch back as the second feed path 46 by controlling the second switching device 48. Accordingly, the document 100 that has switched back is introduced to the second feed path 46 in an opposite direction (an opposite direction to the thick arrow in FIG. 7). A feed path of the document 100 after the switchback is illustrated in FIG. 11.

As described above, in the switchback control, the document 100 after the switchback is introduced to the second feed path 46 in the opposite direction. At this time, the controller feeds the document 100 toward the reading portion 33 by forward rotating the resist roller 341 (see FIG. 11).

As described above, the second feed path 46 preferably has the U-turn shape. Accordingly, the document 100 that has switched back is turned over by being fed in the second feed path 46, causing the second side to face down. Since the document 100 after the switchback enters the reading portion 33 in this state, the second side of the 100 is read by the scanner 25. At this time, the document 100 after the switchback enters the reading portion 33 in a same direction as the first direction (see FIG. 11).

As described above, in the switchback control, by causing the document 100 to enter the reading portion 33 in the same direction as the first direction after causing the document 100 to switch back, the document 100 is turned over and the second side is read.

In the switchback control, the document 100 of which the second side has been read is introduced to the first feed path 42. The controller feeds the document 100 toward the first switching device 47 by forward rotating the drive roller 351 of the triple roller 35 (see FIG. 11).

In the switchback control, the controller sets a destination of the document 100 of which the second side has been read as the discharge path 43 by controlling the first switching device 47. Accordingly, the document 100 of which the second side has been read is introduced to the discharge path 43.

In the above-described switchback control, the document 100 of which the second side has been read may be directly discharged to the discharge tray 53. In the above-described case, however, the document 100 of which the second side has been read is introduced to the discharge path 43 with the second side facing down. Therefore, if the document 100 is discharged to the discharge tray 53 in this state, the first side faces up. The order of the documents 100 is thus changed.

In the switchback control, the switchback of the document 100 is thus preferably performed two times. That is, in the switchback control, the controller causes the document 100 introduced to the discharge path 43 after the second side has been read to again switch back (a second switchback) in the discharge device 36. The controller then feeds the document 100 once again in a same path as before (a path illustrated in FIG. 11). Accordingly, the document 100 is turned over again and is brought back to the state in which the first side faces down. Then, the document 100 in this state is discharged from the discharge device 36 to the discharge tray 53. Accordingly, the document 100 is discharged to the discharge tray 53 in the state of the face-down.

As described above, the controller of the ADF 24 of the present preferred embodiment is configured or programmed to perform the U-turn control to read both sides by causing the document 100 to U-turn without causing the document 100 to switch back, and the switchback control to read both sides by causing the document 100 to switch back.

As can be seen in FIG. 9, when performing the U-turn control, if a length of the document 100 in the feed direction is longer than a length of the first feed path 42 and the U-turn path 45 combined together, a tip end and a rear end of the document 100 overlap with each other at the reading portion 33. In such a case, images of the document 100 cannot be appropriately read by the scanner 25. Thus, in a case of reading both sides of such a document 100, not the U-turn control, but the switchback control is required to be performed.

On the other hand, in the switchback control, since the document 100 is caused to switch back and is then fed, a period of time longer than the U-turn control is required. In particular, in a case where the document 100 is discharged in the face-down state in the switchback control, the switchback is required to be performed two times and thus a further longer period of time is required.

Therefore, for a document to which both the U-turn control and the switchback control are to be performed, not the switchback control, but the U-turn control is advantageously performed in terms of a processing speed.

Therefore, the controller of the ADF 24 of the present preferred embodiment is configured to switch and perform the U-turn control to read both sides by causing the document 100 to U-turn without causing the document to switch back, and the switchback control to read both sides by causing the document 100 to switch back according to the length of the document 100 in the feed direction.

In such a manner, the U-turn control and the switchback control preferably is used according to the length of the document in the feed direction. Accordingly, the multifunction peripheral device 1 is configured to be compact, and reduction in a reading speed is reliably prevented.

A more specific description will be made as follows. The controller of the ADF 24 of the present preferred embodiment preferably is configured or programmed to function as a document type specifying device that specifies a type of the document 100 (either a first type document or a second type document) according to the length of the document 100 in the feed direction. In the present preferred embodiment, the controller as the document type specifying device is configured to specify whether the document 100 is the first type document or the second type document.

The second type document indicates a document having a longer length in the feed direction than the first type document. More specifically, the document 100 of which length in the feed direction is less than a predetermined length is referred to as the first type document, and the document 100 of which length in the feed direction is equal to or more than the predetermined length is referred to as the second type document.

The "predetermined length" may be any length equal to or less than the length of the first feed path 42 and the U-turn path 45 combined together (a path length of a loop path with the reading portion 33 as a starting point). In other words, in a case where the length in the feed direction is less than the "predetermined length" (the first type document), a problem in which a tip end and a rear end of a document overlap with each other at the reading portion 33 when the relevant document is caused to U-turn is assumed not to occur. Therefore, in a case where the document 100 is determined to be the first type document, the U-turn control preferably is used to read both sides of the document 100. In other words, a "short document" in which no problem occurs even when performing the U-turn control is referred to as the first type document, and a "long document" in which a problem might occur when performing the "U-turn control" is referred to as the second type document.

A method for specifying whether the document 100 is the first type document or the second type document is not limited in particular, but in the present preferred embodiment, the document length sensor 15 provided in the paper feed tray 52 is preferably used. The document length sensors 15 is configured to be capable of detecting whether or not the length in the feed direction of the document 100 set on the paper feed tray 52 is equal to or more than the predetermined length. The controller of the present preferred embodiment is configured to specify based on a detection result of the document length sensor 15 whether the document 100 is the first type document or the second type document.

When specifying that the document 100 is the first type document (a relatively short document), the controller of the present preferred embodiment performs the U-turn control to read both sides of the relevant document 100. In other words, the controller causes the document 100 specified as the first type document to enter the reading portion 33 in the first direction to read the first side, then feeds the document 100 in the U-turn manner without causing the document 100 to switch back, and then causes the document 100 to enter the reading portion 33 in the second direction to read the second side.

Accordingly, in the ADF 24 of the present preferred embodiment, since when reading both sides of the relatively short document (the first type document), the document is turned over by the U-turn control that does not perform the switchback to read the second side, reading of the document is performed at a higher speed compared to a case of performing the switchback control.

On the other hand, when specifying that the document 100 is the second type document (a relatively long document), the controller of the present preferred embodiment performs the switchback control to read both sides of the relevant document 100. Accordingly, the controller is configured or programmed to read the first side of the document 100 specified as the second type document at the reading portion 33, and then cause the document 100 to switch back to read the second side at the reading portion 33.

In such a manner, in the ADF 24 of the present preferred embodiment, when reading both sides of the relatively long document (the second type document), the document is turned over by the switchback control. Since the path for the U-turn (the first feed path 42 and the U-turn path 45) is thus not required to be long to handle a long document, the ADF 24 can be configured to be compact.

As described above, the controller of the ADF 24 of the present preferred embodiment performs the above-described switchback control as follows. That is, the controller is configured or programmed to cause the document 100 specified as the second type document to enter the reading portion 33 in the first direction to read the first side, and then cause the document 100 to switch back and to enter the reading portion 33 in the first direction (FIG. 11).

In such a manner, the controller is configured or programmed to turn over the second type document and read the second side by causing the second type document of which the first side has been read at the reading portion 33 to switch back and to enter the reading portion 33 again in the same direction.

As described above, the ADF 24 of the present preferred embodiment includes the reading portion 33 where one side of the document 100 is read, and the controller. The controller is configured or programmed to function as the document type specifying device that specifies whether the document 100 is the first type document or the second type document of which length in the feed direction is longer than the first type document. In addition, the controller is configured or programmed to function as the feed controller that controls feeding of the document 100. In other words, the controller as the feed controller is configured or programmed to perform the U-turn control in which the first type document is fed to the reading portion 33 with the first side facing down (in an orientation in which the first side is read), then is fed in the U-turn manner without switching back, and is further fed to the reading portion 33 with the second side facing down (in an orientation in which the second side is read). Furthermore, the controller as the feed controller is configured or programmed to perform the switchback control in which the second type document is fed to the reading portion 33 with the first side facing down, then switches back, and is further fed to the reading portion 33 with the second side facing down. In the controller, the feed controller is configured or programmed to switch and perform the U-turn control and the switchback control according to the type of the document (either the first type document or the second type document) specified by the document type specifying device.

Next, a variant preferred embodiment of the above-described preferred embodiment will be described.

Figure 12:
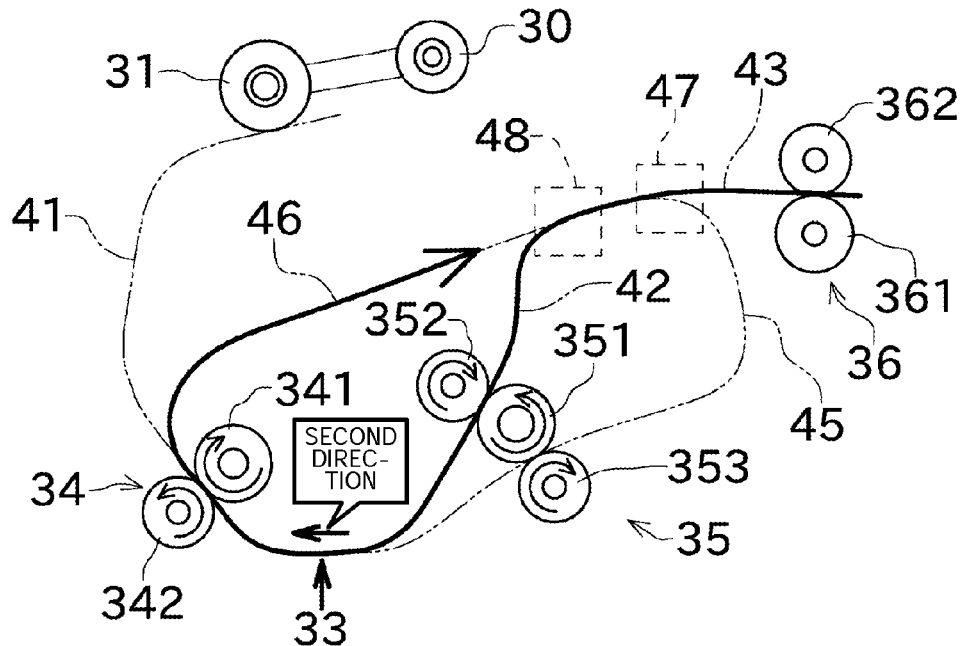
FIG. 12 is a schematic view illustrating a feed path after a second switchback.

In the above-described preferred embodiment, the feed path of a document after the switchback is described (FIG. 11). The feed path is referred to as a first post-switchback feed path. Other than this, in a case of a configuration of the above-described ADF 24, the document after the switchback can be fed in a feed path illustrated in FIG. 12. The feed path in FIG. 12 is referred to as a second post-switchback feed path.

That is, in the first post-switchback feed path (FIG. 11), the document 100 after the switchback is introduced to the second feed path 46. Contrary to this, the second post-switchback feed path (FIG. 12) is to introduce the document 100 after the switchback to the first feed path 42 in which the document 100 passed immediately before the switchback.

First, similarly to the above-described switchback control, the controller reads the first side of the document 100 and then causes the document 100 to switch back.

When feeding the document 100 in the second post-switchback feed path, the controller sets a destination of the document 100 that has switched back as the first feed path 42 by controlling the second switching device 48. Accordingly, the document 100 that has switched back is introduced to the first feed path 42 in an opposite direction (a direction opposite to the thick arrow in FIG. 4). At this time, the controller feeds the document 100 toward the reading portion 33 by reversely rotating the drive roller 351 of the triple roller 35 (see FIG. 12).

As illustrated in FIG. 12, the document 100 after the switchback that is fed in the second post-switchback feed path enters the reading portion 33 in the direction (the second direction) opposite to the first direction. In this state, the document 100 after the switchback has not yet been turned over and the first side remains to face down. The controller thus does not read the second side of the document 100 at this point and causes the document 100 to pass the reading portion 33.

In the second post-switchback feed path, the document 100 that has passed the reading portion 33 is introduced to the second feed path 46. At this time, the controller feeds the document 100 toward the first switching device 47 by reversely rotating the resist roller 341 (see FIG. 12). Since the second feed path 46 is configured in the U-turn shape, the document 100 that has passed the reading portion 33 is turned over by being fed in the second feed path 46, and thereby the second side faces down.

When the document 100 that has passed the reading portion 33 is fed from the U-turn path 45 to the first switching device 47, the controller sets a destination of the document 100 as the discharge path 43 by controlling the first switching device 47. Accordingly, the document 100 is introduced to the discharge path 43.

The document 100 introduced to the discharge path 43 is fed to the discharge device 36. At this time, the controller causes the document 100 to switch back again by controlling the discharge device 36, and feeds the document 100 again to the second post-switchback feed path (a second switchback). Accordingly, the document 100 again enters the reading portion 33 in the second direction. As described above, since the second side of the document 100 in this state faces down, the second side of the document 100 is read at the reading portion 33 by the scanner 25.

As described above, the second side may not be read immediately after the first switchback, and the second side may be read after the second switchback.

When performing the switchback control by using the above-described second post-switchback feed path, the controller feeds the second type document as follows. That is, the controller causes the document 100 specified as the second type document to enter the reading portion 33 in the first direction to read the first side, and then causes the document 100 to switchback and to pass the reading portion 33 in the second direction, which is the direction opposite to the first direction. Subsequently, the controller causes the document 100 to switch back again and to enter the reading portion 33 in the second direction.

In such a manner, the controller preferably causes the second type document of which the first side has been read at the reading portion 33 to enter the reading portion 33 in the opposite direction after the switchback. In this case, however, since the second type document is not turned over by performing the switchback one time, the switchback is required to be performed two times to read the second side.

In the above-described second post-switchback feed path, the controller causes the second type document of which the first side has been read to switch back and then feeds in the first feed path 42 in the opposite direction such that the second type document enters the reading portion 33. In such a manner, by using the first feed path 42 in which the document 100 after the first side has been read is fed, the document 100 after the switchback is fed to the reading portion 33.

Next, a second preferred embodiment of the present invention will be described. The same reference numerals are denoted on the drawings for a same or similar configuration of the above-described first preferred embodiment, and redundant description will be omitted.

Figure 13:
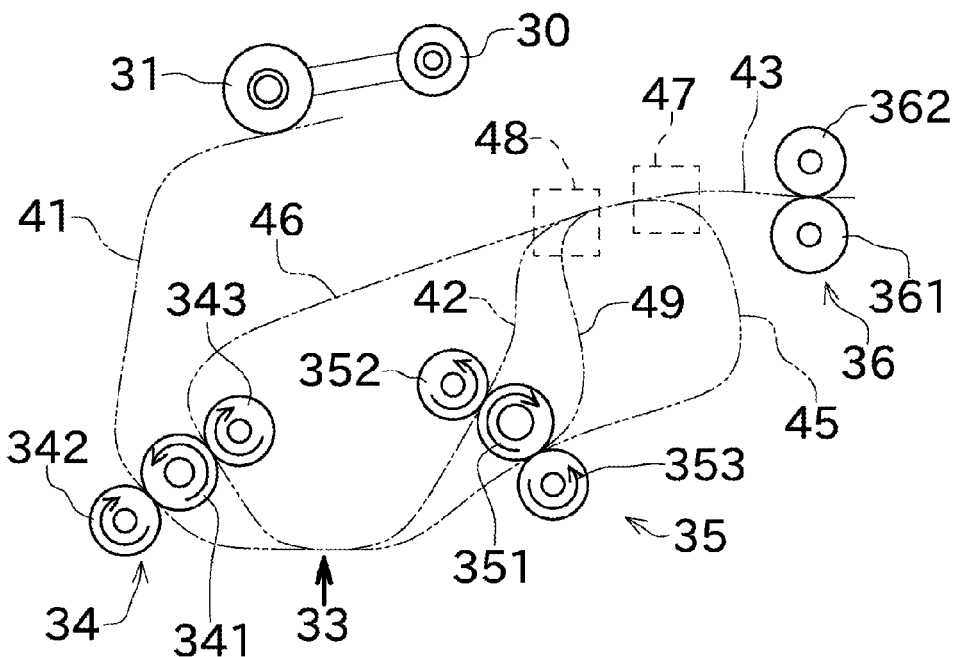
FIG. 13 is a schematic view illustrating a document feed path of a second preferred embodiment of the present invention.

A document feed path of the ADF 24 of the second preferred embodiment is illustrated in FIG. 13. The second preferred embodiment is different from the first preferred embodiment in a feature in which the resist device 34 is a triple roller, and a feature in which a third feed path 49 is provided.

As illustrated in FIG. 13, the resist device 34 of the second preferred embodiment includes the resist roller 341, the driven roller 342, and a driven roller 343. In the second preferred embodiment, the resist roller 341 is arranged at a position sandwiched by the introduction path 41 and the second feed path 46. The driven roller 342 is arranged on an opposite side of the resist roller 341 with the introduction path 41 therebetween. The driven roller 343 is arranged on an opposite side of the resist roller 341 with the second feed path 46 therebetween.

The third feed path 49 is configured such that a document that has switched back is introduced to a portion in a middle of the U-turn path 45. As illustrated in FIG. 13, the third feed path 49 of the second preferred embodiment is provided inside a loop defined by the first feed path 42 and the U-turn path 45. The third feed path 49 connects the second switching device 48 and the middle portion of the U-turn path 45.

Figure 14:
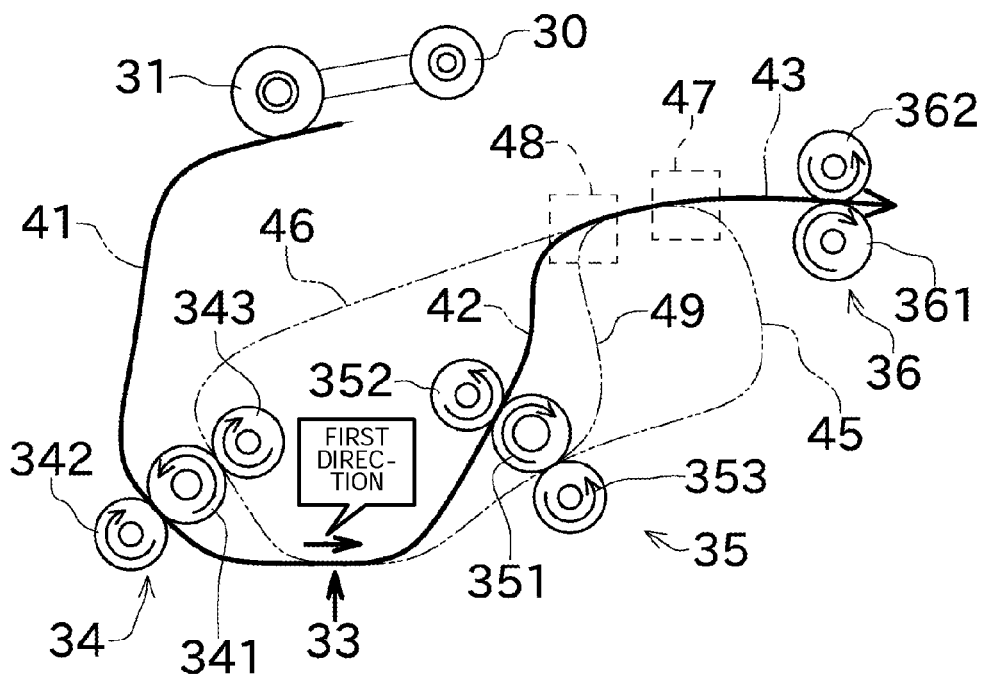
FIG. 14 is a schematic view illustrating a feed path in a case of reading one side in the second preferred embodiment of the present invention.

In the second preferred embodiment, a feed path in a case of reading one side of the document 100 is illustrated in FIG. 14. That is, in the case of reading one side of the document 100, the controller feeds the document 100 in the introduction path 41 and causes the document 100 to enter the reading portion 33 in the first direction to read the first side. Subsequently, the controller feeds the document 100 in the first feed path 42 and discharges to the discharge tray 53 via the discharge path 43. In this case, the controller is merely required to forward rotate all of the resist roller 341, the drive roller 351 of the triple roller 35, and the discharge roller 361 (see FIG. 14).

Figure 15:
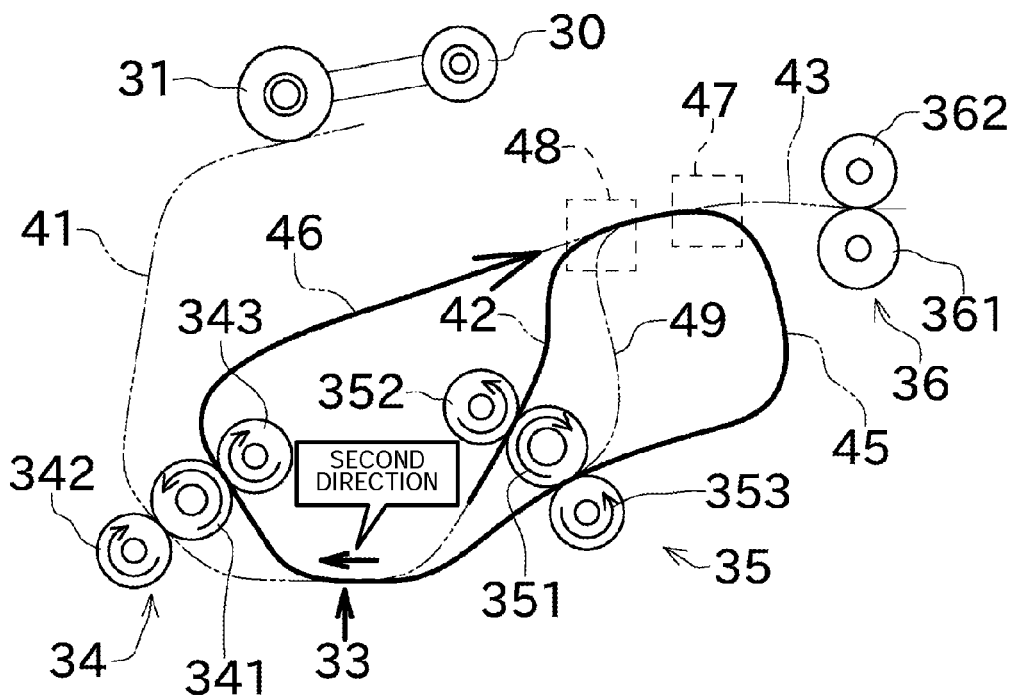
FIG. 15 is a schematic view illustrating a feed path of a document after a first type document has been read in a U-turn control of the second preferred embodiment of the present invention.

In a U-turn control of the second preferred embodiment, a feed path of a document after the first side has been read is illustrated in FIG. 15. That is, in a case of performing the U-turn control in the second preferred embodiment, the controller causes the document 100 of which the first side has been read at the reading portion 33 to enter the reading portion 33 in the second direction with the second side facing down by feeding the document 100 in the first feed path 42 and the U-turn path 45 and turning over the document 100. The controller then feeds the document 100 of which the second side has been read in the second feed path 46 and discharges to the discharge tray 53 via the discharge path 43. In this case, the controller is merely required to forward rotate all of the resist roller 341, the drive roller 351 of the triple roller 35, and the discharge roller 361 (see FIG. 15).

Figure 16:
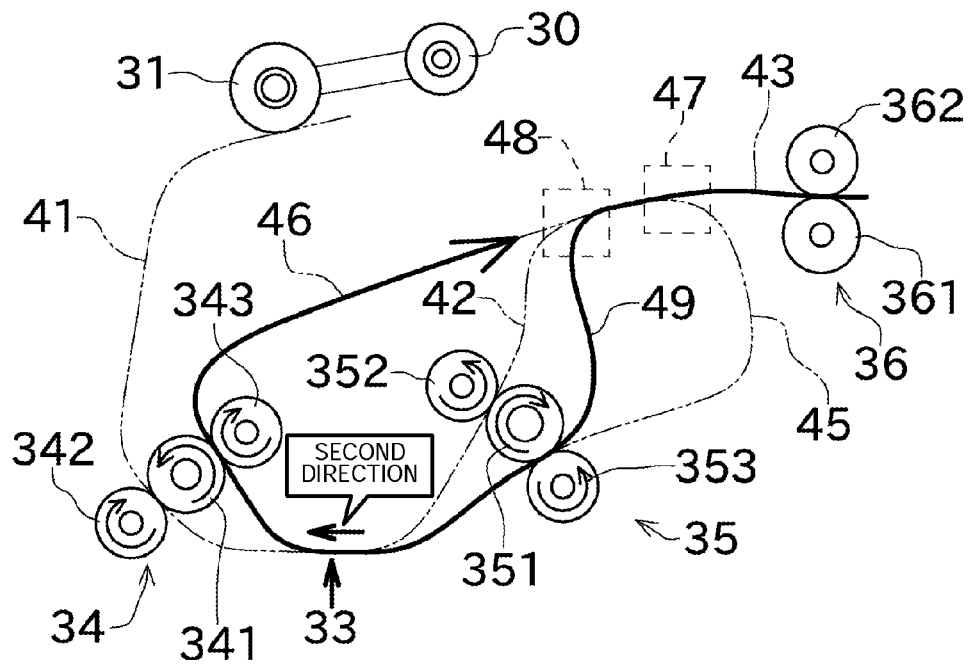
FIG. 16 is a schematic view illustrating a feed path of a document after a switchback in a switchback control of the second preferred embodiment of the present invention.

In a switchback control of the second preferred embodiment, a feed path of a document after switching back is illustrated in FIG. 16. That is, in a case of performing the switchback control in the second preferred embodiment, the controller sets a destination of the document 100 that has switched back as the third feed path 49 by controlling the second switching device 48. The document 100 introduced to the third feed path 49 is fed in the third feed path 49 and is introduced to the middle portion of the U-turn path 45. The document 100 is then fed in the U-turn path 45, and passes between the drive roller 351 and the driven roller 353 of the triple roller 35 (see FIG. 16).

At this time, the controller feeds the document 100 toward the reading portion 33 by forward rotating the drive roller 351 (FIG. 16). Accordingly, as illustrated in FIG. 16, the document 100 enters the reading portion 33 in the second direction. In this state, the document 100 is not yet turned over, and the first side faces down. The controller thus does not read the document 100 at this point and causes the document 100 to pass the reading portion 33.

The document 100 that has passed the reading portion 33 is introduced to the second feed path 46. At this time, the controller feeds the document 100 toward the first switching device 47 by forward rotating the resist roller 341 (see FIG. 16). Since the second feed path 46 is configured in the U-turn shape, the document 100 that has passed the reading portion 33 is turned over by being fed in the second feed path 46, causing the second side to face down.

When the document 100 that has passed the reading portion 33 is fed from the U-turn path 45 to the first switching device 47, the controller sets a destination of the document 100 as the discharge path 43 by controlling the first switching device 47. Accordingly, the document 100 is introduced to the discharge path 43.

The controller causes the document 100 to switch back again and feeds the document 100 to the third feed path 49 to read the second side of the document 100 (a second switchback). Then, after the second switchback, the document 100 again enters the reading portion 33 in the second direction. At this time, the second side of the document 100 is read.

In the multifunction peripheral device 1 of the second preferred embodiment also, when reading both sides of a document (the second type document) of which length is equal to or more than the predetermined length, the switchback control is performed. Accordingly, in the second preferred embodiment, the controller feeds the document 100 specified as the second type document as follows. That is, the controller causes the second type document of which the first side has been read to switch back, then feeds in a path (specifically, the third feed path 49) different from the first feed path 42, and causes the second type document to enter the reading portion 33 in the second direction.

In other words, in the second post-switchback feed path illustrated in FIG. 12 as the variant preferred embodiment of the first preferred embodiment, to cause a document after the switchback to enter the reading portion 33 in the second direction, the document is fed in the first feed path 42 in an opposite direction. In the second post-switchback feed path, the drive roller 351 is thus required to be reversely rotated. In this respect, in the second preferred embodiment, since a document after the switchback is fed in the third feed path 49, which is different from the first feed path 42, the drive roller 351 is not required to be reversely rotated.

In the multifunction peripheral device 1 of the second preferred embodiment, there is provided the third feed path 49 by which the second type document that has switched back is introduced to the U-turn path 45.

Accordingly, the second type document after the switchback is fed to the reading portion 33 by use of the U-turn path 45.

As described above, in the second preferred embodiment, the resist roller 341, and the drive roller 351 of the triple roller 35 are merely required to be forward rotated and do not require to be reversely rotated in any of the case of reading only one side of a document (FIG. 14), the U-turn control (FIG. 15) and the switchback control (FIG. 16) both for reading both sides. According to the above-described second preferred embodiment, since the resist roller 341 and the drive roller 351 are not required to be reversed, a rotation switching mechanism for the resist device 34 and the triple roller 35 can be omitted.

Preferred embodiments (and the variant preferred embodiment) of the present invention are described above, but the above-described configuration may be modified as follows, for example.

In the switchback control of the first preferred embodiment, a document may be fed in the first post-switchback feed path (FIG. 11) after the first switchback, and then the document may be fed in the second post-switchback feed path (FIG. 12) after performing the second switchback. In such a manner, the first post-switchback feed path and the second post-switchback feed path may be used in combination. In this case, the second side may be read after the second switchback. In a case of using this switchback control, the document 100 that has been determined to be the second type document is fed as follows. That is, the second type document first enters the reading portion 33 in the first direction, and the first side is read. Then, the second type document enters the reading portion 33 in the first direction after performing the first switchback, but passes the reading portion 33 without having the second side read. Subsequently, the second type document enters the reading portion 33 in the second direction after performing the second switchback, and the second side is read.

In the case (FIG. 12) where the document enters the reading portion 33 in the second direction after the second switchback, since the second side of the document that passes the reading portion 33 faces down, the second side is read at this point.

In the above-described preferred embodiment, the switchback of the document is performed by reversely rotating the discharge roller 361, but the present invention is not limited thereto. A roller for a switchback may be provided separately from the discharge device 36.

Figure 17:
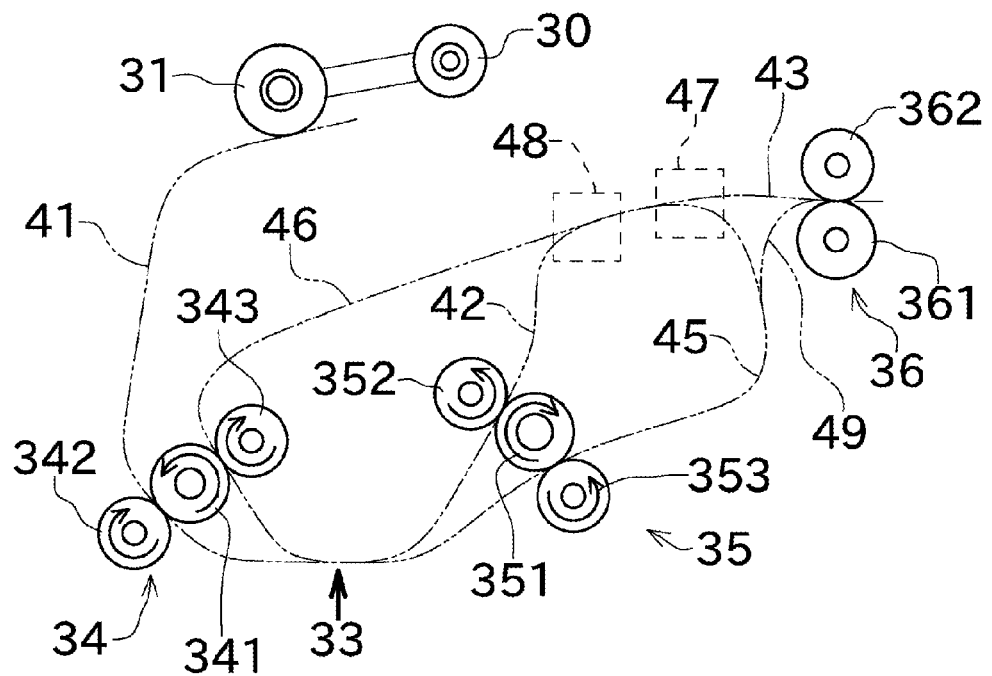
FIG. 17 is a schematic view illustrating a variant preferred embodiment of the second preferred embodiment of the present invention.

In the second preferred embodiment (FIG. 13), the third feed path 49 is arranged inside the loop defined by the first feed path 42 and the U-turn path 45. But without being limited thereto, the third feed path 49 is merely required to be configured such that a document that has switched back is introduced to the middle portion of the U-turn path 45. For example, as illustrated in FIG. 17, the third feed path 49 may be provided outside the loop defined by the first feed path 42 and the U-turn path 45 to directly connect the discharge path 43 and the U-turn path 45 by the third feed path 49.

In the above-described preferred embodiment, the controller acquires by the document length sensor 15, whether or not the length of the document 100 in the feed direction is less than the predetermined length, and specifies whether the document 100 is the first type document or the second type document based on this. However, a method for acquiring the length of the document 100 is not limited to the document length sensor 15 of the paper feed tray 52. For example, an appropriate sensor may be provided in the document feed path 40, and a length of a fed document in the feed direction may be detected thereby. Furthermore, for example, by a user operating the operation panel (an operation inputting device) 12 for input, the length of the document in the feed direction may be set manually. In this case, the operation panel 12 can be regarded as a "document length acquiring device".

The controller in the above-described preferred embodiments preferably specifies the document 100 of which length in the feed direction is "less than" the predetermined length as the first type document, and specifies the document 100 of which length in the feed direction is "equal to or more than" the predetermined length as the second type document. However, a criterion for specifying the first type document and the second type document is not limited thereto. In short, a short document (the first type document) in which no problem occurs even when performing the U-turn control and a long document (the second type document) in which a problem may occur when performing the U-turn control are merely needs to be differentiated. For example, the document 100 of which length in the feed direction is "equal to or less than" the predetermined length may be specified as the first type document, and the document 100 of which length in the feed direction is "longer than" the predetermined length may be specified as the second type document. Furthermore, for example, the predetermined length may be two or more. In this case, three or more types of documents may be specified according to the length in the feed direction (in other words, the document type specifying device may further specify a third type document, a fourth type document, . . . ). For example, since the ADF 24 of the above-described preferred embodiment preferably includes three document length sensors 15 (see FIG. 2), four types of the document can be specified according to the length of the document in the feed direction. In a case of specifying three or more types of the documents, whether the U-turn control or the switchback control is to be applied to each of the types may be set in advance or may be set by the user according to user's preference.

In the above-described preferred embodiments, description is made on the condition that the ADF 24 includes the controller, but hardware (the CPU, the RAM, and the ROM) and software of the controller is not necessarily embedded in a housing of the ADF 24. For example, the hardware and the software of the controller that control the ADF 24 may be arranged to a side of the main body of the multifunction peripheral device 1. Furthermore, in the above-described preferred embodiments, the controller of the ADF 24 preferably doubles as the document type specifying device and the feed controller, but the document type specifying device and the feed controller may be realized by different hardware.

A configuration of the present invention is not limited to a multifunction peripheral, and may be applied to various types of image reading devices provided with an auto document feeder such as a copy machine, a facsimile machine each having a single function.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An image reading device comprising:
a reading portion at which one side of a document is read;
a document type specifying device configured to specify whether the document is a first type document or a second type document of which length in a feed direction is longer than the first type document; and
a feed controller configured or programmed to perform a U-turn control and a switchback control, the U-turn control being a control in which after a first side of the first type document has been read at the reading portion, the first type document is fed in a U-turn manner without switching back, and a second side of the first type document is read at the reading portion, and the switchback control being a control in which after a first side of the second type document has been read at the reading portion, the second type document is caused to switch back, and a second side of the second type document is read at the reading portion; wherein
in the switchback control, the feed controller is configured or programmed to cause the second type document to switch back and to pass the reading portion in a second direction after causing the second type document to enter the reading portion in the first direction and reading the first side, and then to cause the second type document to switch back again such that the second type document enters the reading, portion in the second direction, the second direction being opposite to the first direction.

2. The image reading device according to claim 1, further comprising:
- a first feed path in which the document of which a first side has been read is fed in a predetermined direction; wherein
- the feed controller is configured or programmed to cause the second type document of which the first side has been read to switch back and then to feed the second type document in the first feed path in a direction opposite to the predetermined direction so as to enter the reading portion.

3. The image reading device according to claim 1, further comprising:
- a first feed path in which the document of which a first side has been read is fed in a predetermined direction; wherein
- the feed controller is configured or programmed to cause the second type document of which the first side has been read to switch back, and then to feed the second type document in a path so as to enter the reading portion in the second direction, the path being different from the first feed path.

4. The image reading device according to claim 3, further comprising:
- a U-turn path in which the first type document that has been fed in the first feed path is fed to the reading portion in the U-turn manner; and
- a third feed path by which the second type document that has switched back is introduced to the U-turn path.

5. The image reading device according to claim 1, wherein the document type specifying device is configured to specify whether a type of the document is the first type document or the second type document according to the length of the document in the feed direction; and
- the feed controller is configured or programmed to switch and perform the switchback control and the U-turn control according to the type of the document specified by the document type specifying device.

6. The image reading device according to claim 5, further comprising a document length sensor configured to detect a document length being the length of the document in the feed direction; wherein
- the document type specifying device is configured to specify whether the type of the document is the first type document or the second type document based on whether or not the document length detected by the document length sensor is equal to or more than a predetermined length.

7. The image reading device according to claim 6, further comprising:
- a first feed path in which the document of which a first side has been read at the reading portion is fed in a predetermined direction; and
- a U-turn path in which the first type document that has been fed in the first feed path is fed to the reading portion in the U-turn manner; wherein
- the first feed path and the U-turn path define a loop path with the reading portion as a starting point; and
- the predetermined length is a path length of the loop path in the feed direction of the document.

8. The image reading device according to claim 7, further comprising:
- a paper feed tray on which the document is set;
- a discharge tray to which the document that has been read at the reading portion is discharged;
- an introduction path in which the document is fed from a side of the paper feed tray to the reading portion;
- a resist device arranged in a middle of the introduction path; and
- a second feed path in which the document is fed from the reading portion to a side of the discharge tray via the resist device; wherein
- in the U-turn control, the feed controller is configured or programmed to:
  - cause a second side of the document to be read at the reading position after turning over by the first feed path and the U-turn path, the document of which a first side has been read; and
  - discharge the document toward the discharge tray after turning over by the second feed path, the document of which the second side has been read.

9. The image reading device according to claim 5, further comprising an operation input device configured to detect a document length by accepting an input by an operator, the document length being the length of the document in the feed direction; wherein
- the document type specifying device is configured to specify whether the type of the document is the first type document or the second type document based on the document length detected by the operation inputting device.

10. A copy machine comprising:
- the image reading device according to claim 1;
- an image forming device configured to form images on a paper based on read data being images of a document read by the image reading device; and
- a paper feed cassette configured to accommodate a paper therein and to feed the paper to the image forming device.

* * * * *